Sept. 23, 1969　　　　　　G. CARTIER　　　　　　3,469,128

ELECTRIC MOTOR-REDUCTION GEAR ASSEMBLY

Filed May 9, 1967　　　　　　　　　　　　　　2 Sheets-Sheet 1

INVENTOR
Gaston Cartier

BY
*[signature]*
ATTORNEYS

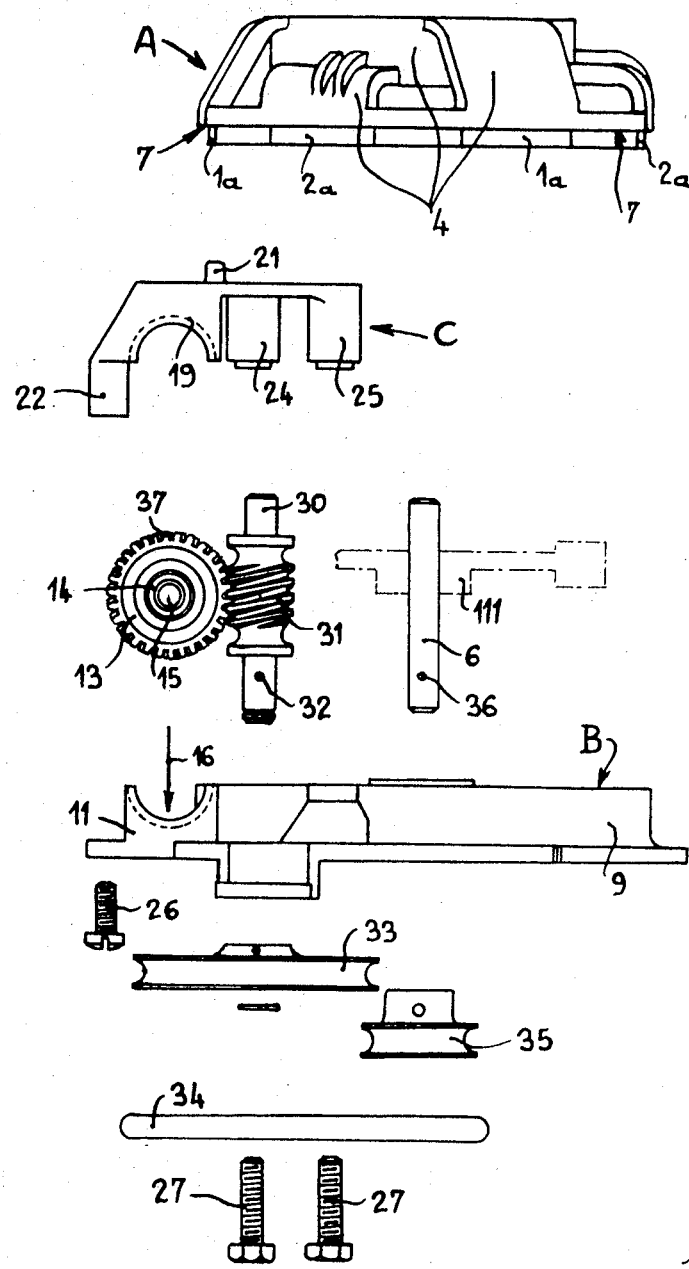

United States Patent Office 3,469,128
Patented Sept. 23, 1969

3,469,128
ELECTRIC MOTOR-REDUCTION
GEAR ASSEMBLY
Gaston Cartier, 8 Ave. de la Liberation,
Cluses, Haute-Savoie, France
Filed May 9, 1967, Ser. No. 637,107
Claims priority, application France, Dec. 8, 1966,
48,037
Int. Cl. H02k 7/10
U.S. Cl. 310—83                                      6 Claims

ABSTRACT OF THE DISCLOSURE

A motor-reduction gear unit comprises a case made of three separate moulded plastics members, namely a shell A, a base B and a detachable cap C. The motor is a flat motor and its stator has pole pieces 1, 2 embedded in the shell A. The motor spindle 6 rotates in bearings one in the base and the other in the shell. A wormshaft 30 is driven by a belt drive 35, 34, 33 and in turn it drives a wormwheel 37 on an output shaft 15. The bearings for the wormshaft are mounted one in the base and one in the cap, and the bearings for the output shaft are half in the base and half in the cap. The unit is compact, rigid and thin.

---

The present invention relates to an electric motor-reduction gear assembly, capable of being made in a very flat shape, with a particularly small bulk, which allows it to be used for special applications, mainly in the automobile industry. The motor-reduction gear is intended, for example, to be housed in the thickness of a door to ensure the remote control of a window-operating mechanism, or to be fitted against the internal wall of the roof to control, likewise remotely, the opening and closing of a sliding roof.

It will be understood that such a motor-reduction gear assembly must have various characteristics in order to be employed on an industrial scale. First of all, it must be able to be mass-produced at a low cost-price. In addition, it is essential that its maximum dimensions, particularly in thickness, shall be smaller than certain limits defined by the general construction of the motor vehicle. Finally, it is desirable that this motor-reduction gear shall be irreversible, so as to fix automatically the sliding window, the opening roof, or any other controlled part, in any intermediate position without it being necessary to have recourse to auxiliary latching devices.

The invention aims at creating a motor-reduction gear assembly unit satisfying the above requirements.

A motor reduction gear assembly unit according to the invention comprises a moulded plastics base; a moulded plastics cover adapted to fit on the base to form a motor housing therewith; a flat motor having a stator which includes a pair of spider-shaped pole pieces embedded in the cover, and a rotor having a spindle journalled in two bearings one in the base and the other in the cover; a wormshaft journalled in bearings one in the base and the other in the cover and extending parallel with the motor spindle; speed-reduction gearing between the spindle and the wormshaft, and an output shaft disposed at right angles to the motor shaft and journalled in two bearings one half of each of which is housed in the base, the other half of each bearing being housed in the cover, there being a wormwheel on the output shaft meshing with the wormshaft.

It will be understood that such a motor-reduction gear will be able to provide a speed reduction, and presents in addition all the desired characteristics of irreversibility, small bulk, ease of manufacture and simplicity of assembly.

One construction of a motor-reduction gear unit in accordance with the invention will now be described, by way of example only, with reference to the accompanying drawings in which:

FIGURE 5 is an exploded view showing in elevation the various components of the assembly.

Figure 1:
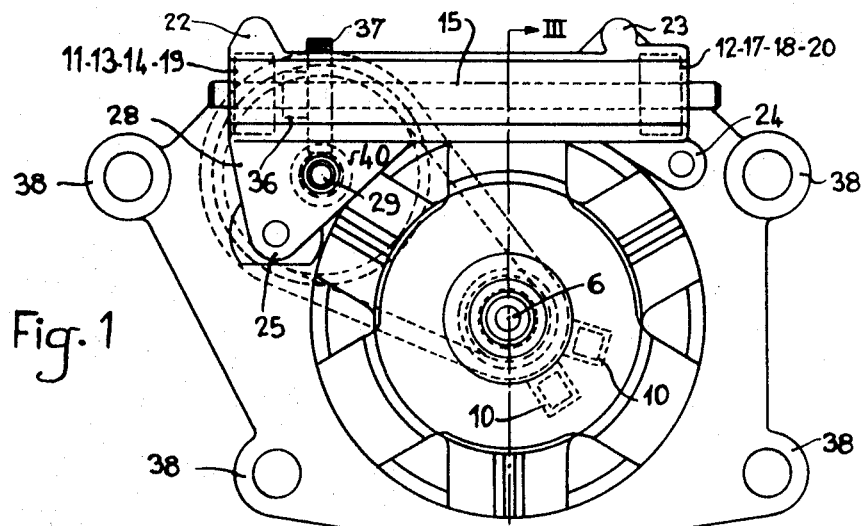
FIGURE 1 is a plan view of a flat motor-reduction gear.
Figure 2:
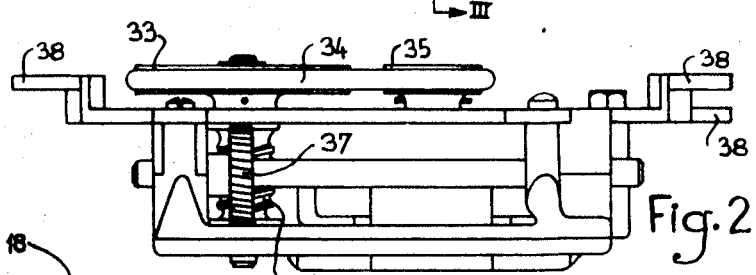
FIGURE 2 is an elevation of the unit shown in FIGURE 1.
Figure 3:
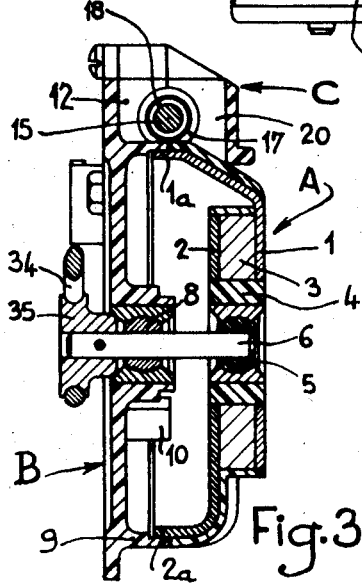
FIGURE 3 is a section along the line III—III in FIGURE 1, in which, for clarity in the drawing, only the rotor shaft is represented.
Figure 4:
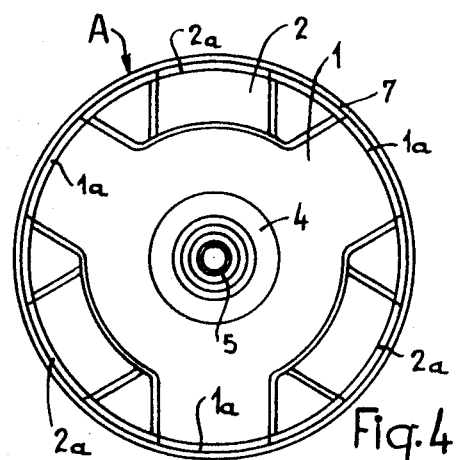
FIGURE 4 is a plan view of the shell of the stator which constitutes one of the three components of the casing of the motor-reduction gear.

The motor-reduction gear assembly shown in the drawings is intended more particularly for fitting to a motor vehicle in order to operate remotely in a sliding roof or a window mechanism. It is presented in the unit form illustrated in FIGURES 1 to 3, and it is mainly noteworthy in that its case or casing is formed by three components, mainly: a stator shell A, an assembly base B and a gear cap C.

The shell A is made in one piece in plastics injected directly on to two star-shaped pole pieces 1 and 2 which are embedded in the moulding. These pole pieces are preferably made from pressed sheet, and each of them comprises, for example, three branches. These latter are arranged alternately and their assembly constitutes three pairs of poles referenced respectively 1a and 2a. Between the flat central parts of the two pole pieces 1 and 2 are interposed magnetising components 3. These latter are with advantage made up from one or several ferrite washers which give a permanent magnetisation to the poles 1a and 2a.

In addition there is embedded in the plastics material 4 of the shell A a central self-centering bearing 5 in which one of the ends of a shaft 6 of the motor rotor is able to revolve. The shell A has a circular opening surrounded by exterior wall 7.

The base B is also made from a single piece of injected plastics. This plastics is moulded around a self-centering bearing 8 which is intended to receive the rotor shaft 6. This bearing 8 is fixed in the centre of a circular seat 9 which forms a cylindrical wall projecting laterally from the base B in the direction of the shell A. The whole is of such dimensions that the open side of this shell A may be fitted exactly with slight force (i.e. a snap fit) into the seat 9 after the rotor is fitted between the components A and B.

In addition there are provided on the internal face of the base B and inside the seat 9 two prismatic seatings 10 of square section in each one of which is fitted one of the two carbon brushes of the electric motor. These brushes slide parallel to the shaft 6 so as to be applied to the commutator 111 (FIGURE 5) of the rotor.

The base B carries in addition two hollow semi-cylindrical sockets 11 and 12 which are open upwards, that is to say in the same direction as the seat 9. The socket 11 is intended to receive a ring 13 made from rubber or supple plastics material which has a cylindrical exterior shape while on the interior it is hollowed out to give a spherical seating in which pivots a metal bearing-knuckle 14. This latter is provided with an axial bore through which passes a rotating spindle 15. The assembly 13–14 constitutes for the spring 15 a self-centering bearing which is introduced transversely into the socket 11 in the direction shown in FIGURE 5 by the arrow 16.

The socket 12 has a similar shape, and it also is intended to receive a cylindrical rubber ring 17 in which a spherical bearing-knuckle 18 turns so as to form a bearing traversed by the other end of the spindle 15.

When the spindle 15 is so arranged, it is in a direction perpendicular to the shaft 6 of the rotor.

The cap C is made from one piece of injected plastics. It carries a semi-cylindrical socket 19 which is intended to fit over the socket 11, and a similar socket 20 provided to complete the socket 12 of the base B. A stiffening rib 21 is provided on the back of the cap C to strengthen it. Four bushes 22, 23, 24 and 25, threaded internally, are moulded into the cap plate C, lying parallel to the rotor shaft 6, in the direction of holes provided in the base B, around the seat 9, These bushes 22, 23, 24 and 25 are intended to take screws of the kind indicated in FIGURE 5 by the references 26 and 27 provided to assemble the cap C and the base B. Near the bush 25, the cap C forms a triangular plate 28 in the centre of which is fitted a ring 29 made from a material with a low co-efficient of friction such as, for example, a superpolyamide.

This ring 29 is intended to constitute a bearing for the upper end of the revolving spindle 30 of a worm gear lying parallel to the rotor shaft 6. The opposite end of this spindle 30 passes through a similar ring 40 incorporated in the base B in this plate, that is to say near to the external wall of the seating 9.

The spindle 30 of the worm gear projects beyond this latter bearing, and there is fixed on its projecting part, for example, by means of a transverse pin 32, a grooved pulley 33 of a large diameter. An endless belt 34 links this pulley 33 to another grooved pulley 35, of smaller diameter, which is fixed on the projecting end of the rotor shaft 6, for example, by means of a diametral pin.

The device is completed by fixing on the spindle 15 the hub 26 of a toothed wormwheel gear 37 which meshes with the worm gear 31. The end of the hub 36 is intended to bear against the metal knuckle of the adjacent bearing, in order to take the axial thrust of the worm gear 31 when the mechanism is working.

Finally, there are arranged near the outer edges of the base B pierced fixing lugs 38 intended to take fixing screws, not shown, allowing the motor-reduction gear assembly to be mounted inside a door or under the roof of a motor vehicle.

The operation of the device is that the rotor of the electric motor drives the small pulley 35, which transfers the movement with a certain speed reduction to the large pulley 33 which is fixed on the spindle 30 of the worm gear 31. This latter in its turn drives the gear 37, which allows the two ends of the spindle 15 to give a slow speed of rotation well suited to the required applications, notably in the automobile industry. Moreover, the worm gear 31 provides the desired irreversability on the device.

It will be seen that the particular construction of a casing A–B and C allows of obtaining at one time a low cost price and a small bulk of the motor reduction gear, whilst conferring a high degree of rigidity to the assembly.

It must moreover be understood that the preceding description has been given only by way of example and that it in no wise limits the scope of the invention which will not be avoided by replacing the manufacturing details described by any other equivalents. In particular, the scope of the invention will not be exceeded by replacing the drive of the shafts 6 and 30 by means of the belt 34 by any other system of gearing. Similarly, the casing may be made, no longer of three separate parts A, B and C but of two or of four assembled parts. For example, the cap C and the shell A could be grouped in a single part.

I claim:

1. A motor-reduction gear unit comprising a moulded plastics base; moulded plastics cover means to fit said base and to form a motor housing therewith; a flat motor within said motor housing; a pair of spider-shaped pole pieces embedded in said cover means and forming part of a stator for said motor; said motor having an output spindle; a first pair of journal bearings mounting said spindle within said motor housing, one of said first pair of journal bearings being supported in said base and the other being supported in said cover means, a wormshaft, a second pair of journal bearings mounting said wormshaft parallel with said motor spindle, one of said second pair of journal bearings being supported in said base and the other being supported in said cover means; speed reduction gearing connecting said motor spindle with said wormshaft; an output shaft; a third pair of journal bearings mounting said output shaft in said motor housing at right angles to said motor spindle, each of said third pair of journal bearings being carried half in said base and half in said cover means, and a wormwheel fixed on said output shaft and meshing with said wormshaft.

2. A motor-reduction gear unit according to claim 1, wherein said cover means comprises a shell in which said stator pole pieces are embedded, said shell also housing one of said first pair of journal bearings, and a gear cap, in which one-half of each of said third pair of journal bearings is carried, said gear cap also housing one of said second pair of journal bearings.

3. A motor-reduction gear unit according to claim 1, wherein said first pair of journal bearings are self-aligning.

4. A motor-reduction gear unit according to claim 2, wherein said first pair of journal bearings are self-aligning.

5. A motor-reduction gear unit according to claim 1, wherein said motor spindle and said wormshaft both project on one side outside said motor housing and said speed reduction gearing is fitted on said outside extension of said spindle and said wormshaft.

6. A motor-reduction gear unit according to claim 5, wherein said speed reduction gearing comprises a belt drive.

References Cited

UNITED STATES PATENTS

| 2,974,409 | 3/1961 | Ghinazzi | 310—83 |
| 3,142,774 | 7/1964 | Lundin | 310—83 |
| 3,171,994 | 3/1965 | Freedman | 310—83 |
| 3,211,018 | 10/1965 | Lundin | 310—83 |
| 3,307,056 | 2/1967 | Woolley | 310—83 |
| 3,373,528 | 3/1968 | Tinder | 310—83 |

J. D. MILLER, Primary Examiner

U.S. Cl. X.R.

49—349; 310—66, 80, 163